United States Patent [19]

Posner et al.

[11] Patent Number: 4,845,736

[45] Date of Patent: Jul. 4, 1989

[54] CROSS-CONNECT SWITCH AND METHOD FOR PROVIDING TEST ACCESS THERETO

[75] Inventors: Edward C. Posner; Patrick Smyth, both of Pasadena, Calif.

[73] Assignee: Pacific Bell, San Francisco, Calif.

[21] Appl. No.: 183,699

[22] Filed: Apr. 19, 1988

[51] Int. Cl.[4] .......................... H04M 3/26; H04B 3/46
[52] U.S. Cl. ........................................ 379/27; 379/272
[58] Field of Search ................. 379/15, 27, 272, 29, 379/1, 16, 17

[56] References Cited

U.S. PATENT DOCUMENTS 4,173,713 11/1979 Gesken et al. .................. 379/272
4,401,861 8/1983 Braun et al. ..................... 379/27

Primary Examiner—Stafford D. Schreyer
Attorney, Agent, or Firm—Fitch, Even, Tabin & Flannery

[57] ABSTRACT

The invention comprises an improved cross-connect switch constructed from a plurality of switch modules for connecting input lines to output lines. The improved switch includes a test access system in which selected input or output lines of the cross-connect switch are utilized as test ports. The switch utilizes computer algorithms to make connections between a test port and one of the switch modules through which a path connecting specified input and output lines passes to make a bridging connection to the path.

6 Claims, 11 Drawing Sheets

CROSS-CONNECT SWITCH AND METHOD FOR PROVIDING TEST ACCESS THERETO

The present invention relates to switching systems for use in communications networks and more particularly to cross-connect switches which must be capable of connection to test facilities.

A cross-connect switch is a switching network which allows pairs of signal lines to be connected without disturbing connections between other lines connected by the cross-connect switch. In general, a cross-connect switch has as its inputs a plurality of input lines and as its outputs a plurality of output lines. Each input line must be capable of being connected to any of the output lines provided the output line in question is not already connected to another input line. Furthermore, introducing a connection between a new input line and a new output line must not interrupt an existing connection between another input line and the output line to which it was connected.

Such cross-connect switches are particularly well suited for use in telecommunications systems. For example, each telephone subscriber is typically connected to a telephone central office by pair of metallic conductors referred to as a subscriber loop. A subscriber is assigned a telephone number by connecting the subscriber loop connecting that subscriber to the central office to input lines of the central office switch which correspond to the telephone number in question. A cross-connect switch may be advantageously used to make these connections. For example, Bergeron, et al. (U.S. Pat. No. 3,978,291) describe a cross-connect switch adapted for making such connections in a telephone system. The cross-connect switch described therein allows any of a plurality of input lines to be connected to any of a plurality of output lines.

In general, a cross-connect switch will be defined to be a switch which is capable of connecting any of N input lines to any of M output lines without disturbing existing connections. For the purposes of this discussion, such a cross-connect switch will be referred to as an NxM cross-connect switch. The cross-connect switch in question is typically constructed from a plurality of switch modules. Each switch module is itself a small cross-connect switch which provides a means for connecting any of a plurality of input lines to any of a plurality of output lines by closing a switch point connecting the input and output lines in question. If the switch module has n input lines and m output lines, the switch module consists of nxm switch points. Each switch point allows one input line to be connected to one output line.

In principle, a cross-connect switch could be constructed from a single such switch module. However, the number of switch points needed to implement the cross-connect switch would be prohibitively large. For example, a cross-connect switch to connect any of 1000 input lines to any of 1000 output lines would require 1,000,000 switch points. This number can be substantially reduced if a number of smaller switch modules are combined to form the cross-connect switch.

Hence, a large cross-connect switch typically is divided into stages. Each stage is constructed from a plurality of switch modules. In "A Study of Nonblocking Switching Networks", Bell Systems Technical Journal, March 1953, pages 406-424, Clos has shown that a class of cross-connect switches may be viewed as a three stage switch. The switch makes connections between a set of input lines and a set of output lines. Assuming that a given input line is not currently connected to an output line and that a given output line is not currently connected to any input line, the switch can be used to provide a connection between the input and output lines in question without disturbing existing connections between other input and output lines. Each stage of the three stage switch is constructed from switch modules. The first stage switch modules connect the cross-connect switch input lines to switch modules in the center stage of the switch. Similarly, the third stage switch modules connect the cross-connect switch output lines to switch modules in the center stage. It should be noted that the center stage may be replaced by a multi-stage switch; hence, this method of viewing a cross-connect is applicable to switches having more than three stages.

One problem in utilizing cross-connect switches in telecommunications applications is the need to provide access to the input and output lines for testing. For example, consider a telephone system in which a cross-connect switch is used to connect each subscriber loop to the central office switch. When a subscriber's service has been interrupted due to a malfunction, the telephone craftspeople must determine if the malfunction lies in the subscriber loop connecting that subscriber to the central office or in the central office itself. One method of making this determination is to connect the subscriber loop in question to a metallic test facility which measures a number of predetermined electrical parameters associated with the subscriber loop. The operation of this test facility requires that it be electrically connected to the subscriber loop in question. That is, each conductor of a pair of conductors from the metallic test facility must be connected to a corresponding conductor in the subscriber loop. In prior art cross-connect switches, providing this capability substantially increases the cost of the cross-connect switch.

One prior art method for providing this test capability utilizes one or more input lines in each switch module in the output stage of the cross-connect switch for providing test access to each subscriber loop. In such systems, each switch module in the output stage of the cross-connect switch includes an additional input line which is connected to the test facility instead of to the previous stage in the cross-connect switch. Since each switch module in the output stage allows any input thereto to be connected to any output thereof, the test facility can be connected to any subscriber loop connected to a specific output stage switch module by coupling the input line reserved for testing to the subscriber loop in question.

This type of test system can be quite expensive in cross-connect switches which utilize relatively small switch modules in the output stage. Consider a 1024×1024 cross-connect switch. The cost of such a cross-connect switch is related to the number of switch points included therein. Hence, it is desirable that the number of switch points be minimized. It can be shown that the minimum number of switch points is obtained if the cross-connect switch is constructed from 4×4 switch modules in the center stage and 2×2 switch modules in all other stages. The output stage of such a cross-connect switch has 512 2×2 switch modules. Each 2×2 switch module requires 4 switch points. If test access is to be provided, each of these 2×2 switch modules must be replaced by a 3×2 switch module. A 3×2 requires 6 switch points; hence the cost of the output stage is increased by 50%. In addition, some facility must be provided to guarantee that only one of the output switch modules is connected to the test facility at any given time. This requires an additional 512 switch points, i.e., one per output switch module. Thus, adding the test facility to the cross-connect switch increases the number of switch points by 3 per output stage switch module. That is, it increases the cost by 75%.

In addition to increasing the cost of the cross-connect switch by increasing the number of switch points contained therein, this type of prior art test system requires that a different type of switch module be used in the output stage. The need to produce and provide replacement stocks for this different type of switch module further increases the cost of the cross-connect switch using this type of test system.

Broadly, it is an object of the present invention to provide an improved cross-connect switch.

It is a further object of the present invention to provide a cross-connect switch which is capable of providing test access at a substantially lower cost than prior art cross-connect switches.

It is yet another object of the present invention to provide a cross-connect switch which does not need specially configured switch modules to provide test access to the lines connected to said cross-connect switch.

These and other objects of the present invention will become apparent to those skilled in the art from the following detailed description of the present invention and the accompanying drawings.

SUMMARY OF THE INVENTION

The present invention is a cross-connect switch having a plurality of cross-connect switch input lines and a plurality of cross-connect switch output lines. The cross-connect switch provides a means for coupling a specified one of the input lines to a specified one of the output lines without interrupting existing connections between other input and output lines. The cross-connect switch includes an input stage, an output stage, and one or more intermediate stages.

The input stage includes a plurality of input switch modules. Each input switch module includes a plurality of input lines, a plurality of output lines, and a plurality of switch points. The output stage includes a plurality of output switch modules. Each output switch module also includes a plurality of input lines, a plurality of output lines, and a plurality of switch points. And, each of the intermediate stages comprises a plurality of intermediate switch modules. Each of the intermediate switch modules also includes a plurality of input lines, a plurality of output lines, and a plurality of switch points. Each intermediate stage switch module is coupled to a switch module in the preceding stage by connecting an input line thereof to an output line of a switch module in the preceding stage. And, each of the intermediate stage switch modules is also coupled to at least one switch module in the stage following the intermediate stage in question by connecting an output line thereof to an input line of a switch module in the following stage.

Each of the input, output, and intermediate stage switch modules includes a switch point corresponding to each possible combination of an input line of the switch module and an output line thereof. Each said switch point has a first state in which the switch point makes a connection between the input line and output line in question and a second state in which the switch point does not make a connection between these input and output lines.

The cross-connect switch also includes test circuitry including one or more output test ports. Each test port includes one of the cross-connect switch output lines or one of the cross-connect switch input lines. The number of test ports is less than the number of switch modules in the output stage and less than the number of input modules in the input stage.

The cross-connect switch includes a computer for determining if a connection can be made between a specified one of the test ports and a first specified switch module in the cross-connect switch. The cross-connect switch also includes circuitry which is coupled to the switch points for causing this connection to be made if the computer determines that a connection can be made.

DETAILED DESCRIPTION OF THE INVENTION

Figure 1:
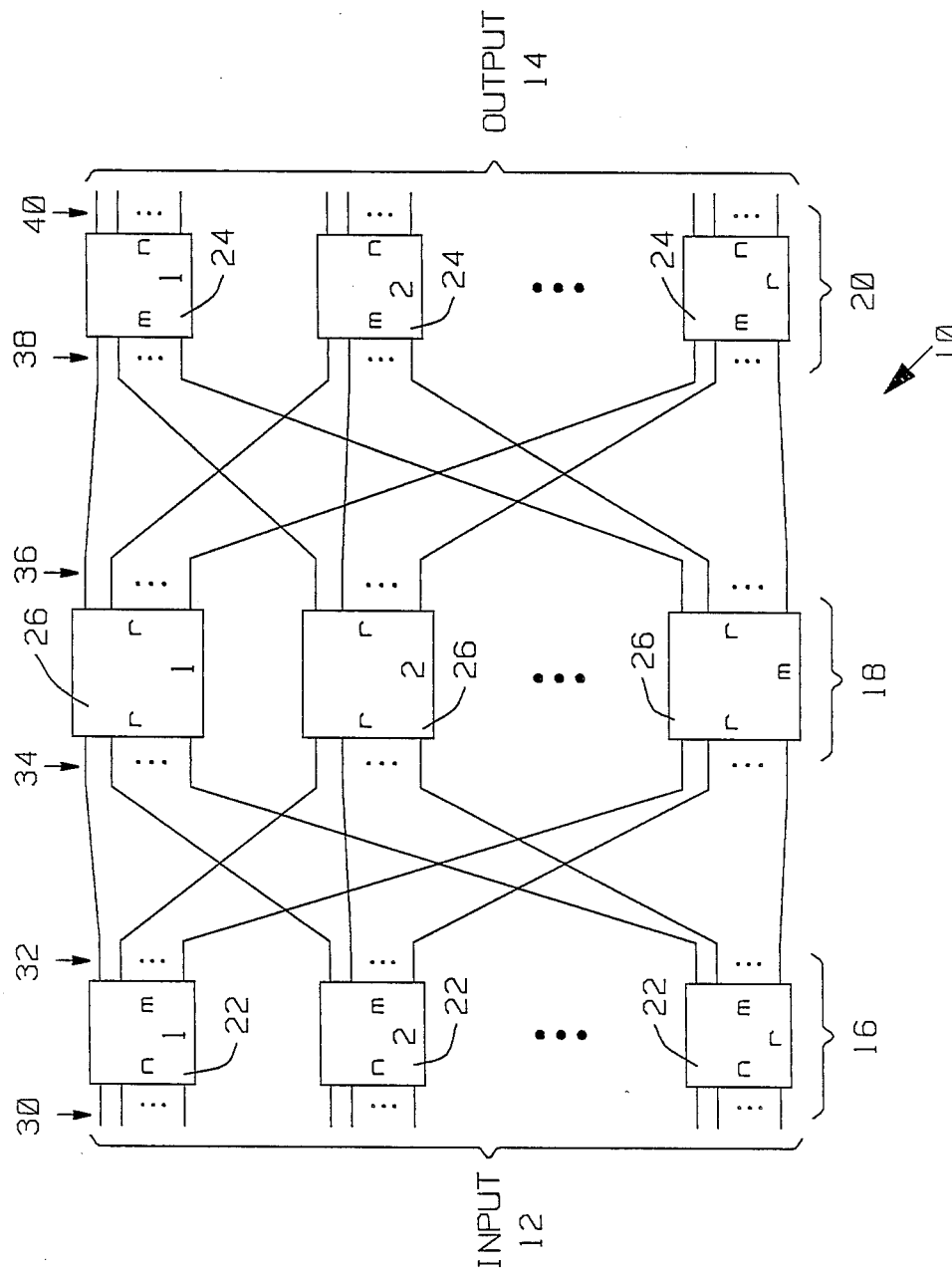
FIG. 1 is a block diagram of a prior art cross-connect switch.

The advantages of the present invention can be most easily understood with reference to a conventional cross-connect switch of the type taught by Clos (Bell Systems Technical Journal, 32, pages 406–424, 1953). A cross-connect switch as taught by Clos is shown in FIG. 1 at 10. Switch 10 connects an input line 12 to an output line 14 provided the pair of lines in question are currently idle. That is, the lines in question are not currently connected to other input or output lines. Switch 10 consists of three stages, an input stage 16, an output stage 20, and a center stage 18. Input stage 16 is constructed from a plurality of input switch modules 22. There are "r" input switch modules 22 in switch 10. Each input switch module provides a means for connecting an input line 30 to an output line 32, provided the input and output lines in question are idle. In the general case, there are n input lines 30 and m output lines 32 associated with each input switch module 22. Input lines 30 also form the input lines 12 of switch 10.

Similarly, the output stage 20 consists of a plurality of output switch modules 24, each output switch module providing a means for connecting an input line 38 to an output line 40 provided the lines in question are idle. There are also r output switch modules 24 in switch 10. Each output module 24 includes m input lines 38 and n output lines 40. Output lines 40 also form the output lines 14 of switch 10.

Finally, the center stage 18 consists of m center switch module 26. Each center switch module has "r" input lines 34 and r output lines 36. Each center stage switch module 26 provides a means for connecting an input line 34 to an output line 36 provided the pair of lines in question is idle. Each input line 34 of any given center stage switch module is connected to a corresponding output line 32 in each input switch module 22. Similarly, each output line 36 of any given center stage switch module is connected to a corresponding input line 38 in each output switch module 24.

A connection from a given input 12 to a given output 14 is made by using the input stage module 22 to which the input in question is connected to connect the input line to one of the center stage switch modules 26. The center stage switch module in question is then used to connect the line to the output stage switch module 24 which includes the output line in question. These connections are made by sending appropriate signals to each of the switch modules in question. For clarity, the signal inputs which are used to control the input switch modules 22, the output switch modules 24, and the center stage switch modules 26 have been omitted from FIG. 1.

Figure 2:
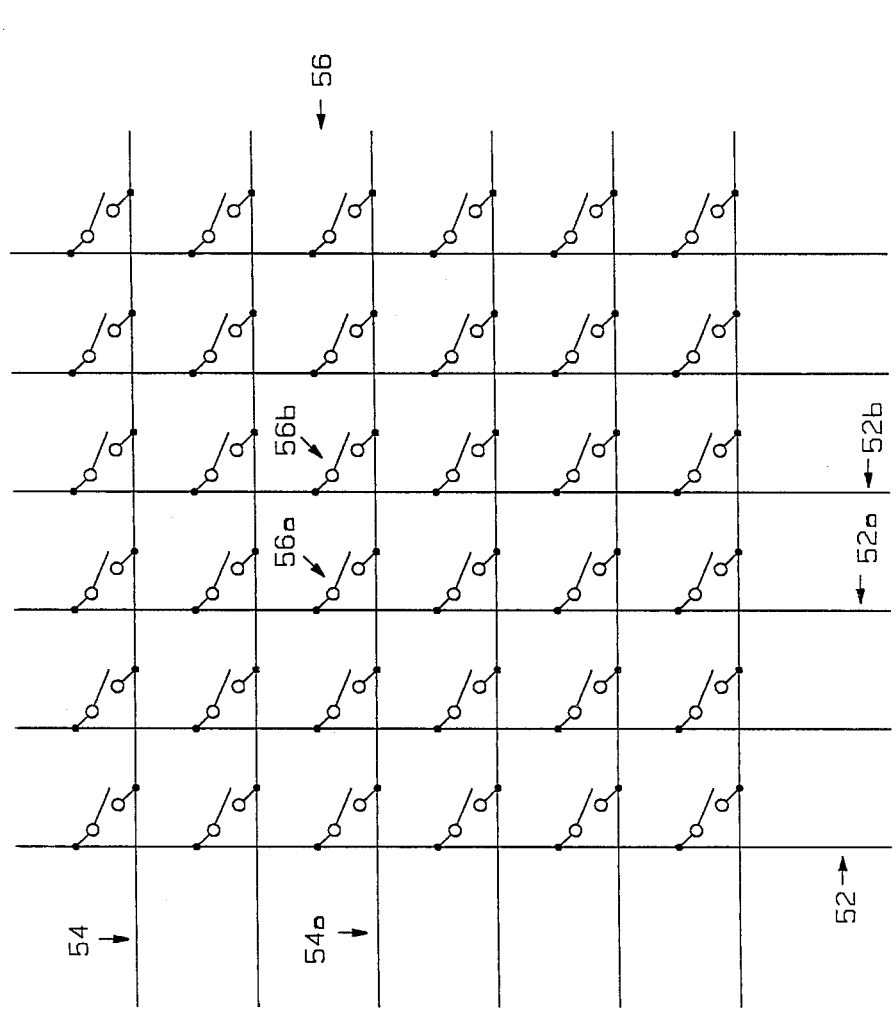
FIG. 2 is a schematic diagram of one of the switch modules shown in FIG. 1.

Each of the switch modules 22, 24, and 26 is constructed from a plurality of switch points as shown in FIG. 2 at 50. Switch module 50 illustrates a switch module for connecting any of six input lines 54 to any of 6 output lines 52. Switch module 50 consists of 36 switch points 56. Each switch connects a specific input line 54 to a specific output line 52. As noted above, the switch points are typically controlled by external signals from a host computer which receives instructions specifying the desired connections.

Although switch module 50 is normally used to connect precisely one input line to one output line, it can also be used to make a "T" connection in which one input line is connected to a plurality of output lines or vice versa. For example, input line 54a can be simultaneously connected to output lines 52a and 52b by simultaneously closing switch points 56a and 56b. Such "T" bridging connections will be discussed in detail below with reference to the various embodiments of the present invention.

Referring again to FIG. 1, switch 10 is shown as consisting of three stages. However, it is to be understood that each center stage switch module 26 may itself be a three stage switch. Hence, switch 10 can represent a switch having any number of stages provided the number is odd.

To simplify the following discussion, a switch module for connecting any of N input lines to any of M output lines will be referred to as an NxM switch module. A switch module may be constructed from an array of switch points 56 such as that shown in FIG. 2 with reference to a switch module 50. Alternatively, the switch module may be constructed from a plurality of smaller switch modules which are connected as a cross-connect switch. By using such an arrangement, cross-connect switches having more than three stages may be constructed.

Figure 3:
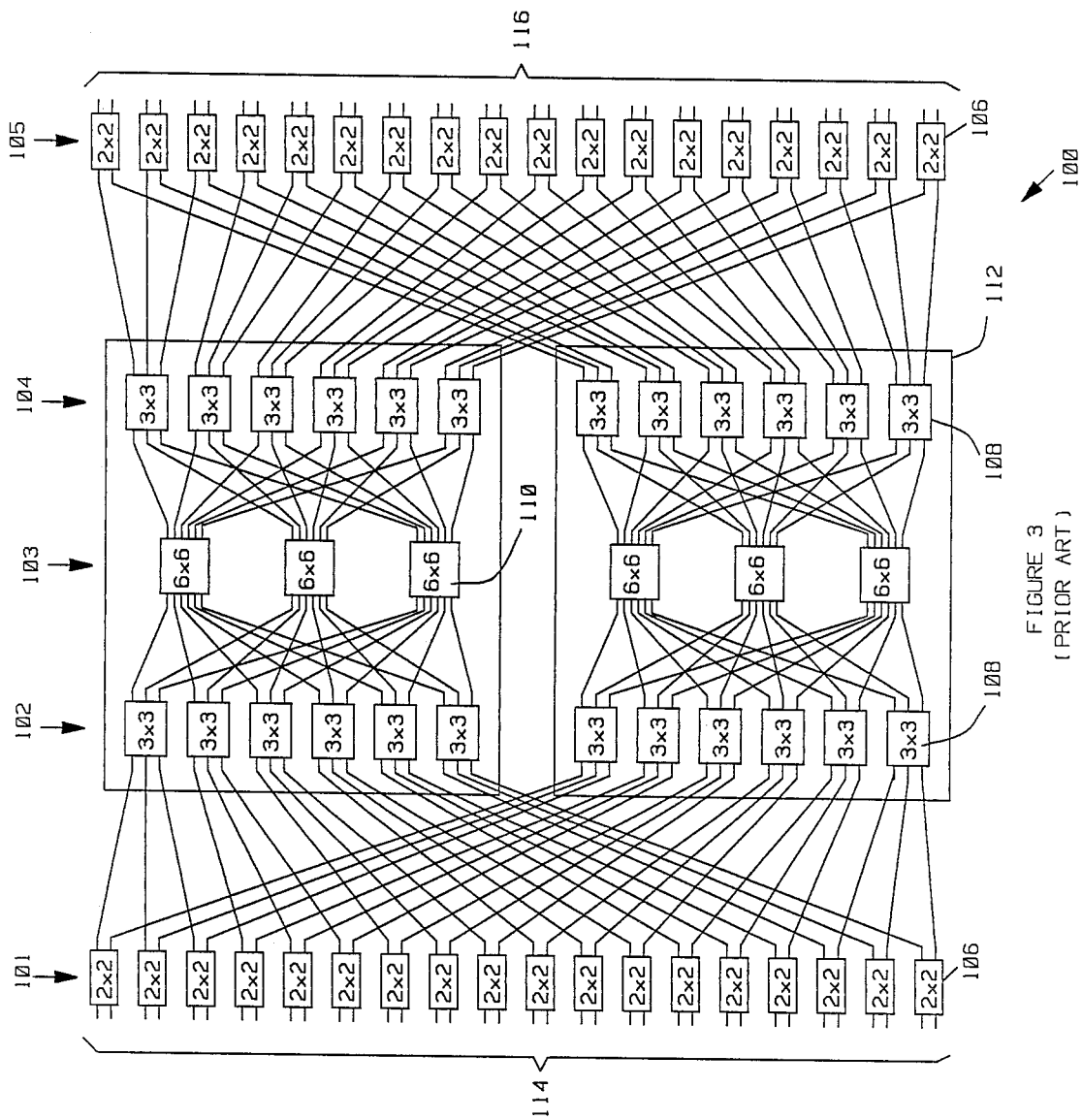
FIG. 3 illustrates a prior art cross-connect switch having 5 stages.

An example of a switch having more than three stages is shown at 100 in FIG. 3. Switch 100 is a 36×36 cross-connect switch. That is, it has 36 input lines 114 and 36 output lines 116. The particular choices of switch module sizes used to construct switch 100 are determined so as to minimize the total number of switch points in switch 100. Methods for so optimizing cross-connect switches having equal numbers of input and output lines are well known to those skilled in the art. These methods dictate that switch 100 have five stages which are shown at 101 through 105 in FIG. 3. The first stage 101 and the fifth stage 105 are constructed from 18 2×2 switch modules 106. The second stage 102 and the fourth stage 104 are constructed from 3×3 switch modules 108. The center stage 103 is constructed from 6×6 switch modules.

Although switch 100 has five stages, it may be viewed as a three-stage Clos switch in which the center stage is constructed from two 18×18 switch modules 112. Each switch module 112 is in turn a three stage switch having a first and third stages constructed from 3×3 switch modules and a center stage constructed from 6×6 switch modules.

For a cross-connect switch such as that shown in FIGS. 1-3 to be of practical utility, it must be modified to provide test access. The test access system provides a means for connecting a test facility to any of the lines connected to the switch outputs. For example, in a telecommunications setting, a cross-connect switch may be used to connect selected subscriber loops to a central office via feeder pairs. In this case, each switch output is connected to a subscriber loop consisting of two metallic conductors which connect a subscriber's telephone to the switch. Each switch input is connected to one of the feeder pairs. The telephone system includes a metallic test facility which allows the integrity of each of the conductors in each of the subscriber loops to be verified. When a service failure is discovered, the subscriber loop in question is connected to the metallic test facility to ascertain if the failure is due to a problem such as a break in one of the conductors or a short between the conductors.

The cross-connect switch may be used to provide this test access. In general, this test access is to be made without interrupting the existing connection between the subscriber loop in question and the feeder pair to which it is connected by the cross-connect switch.

Figure 4:
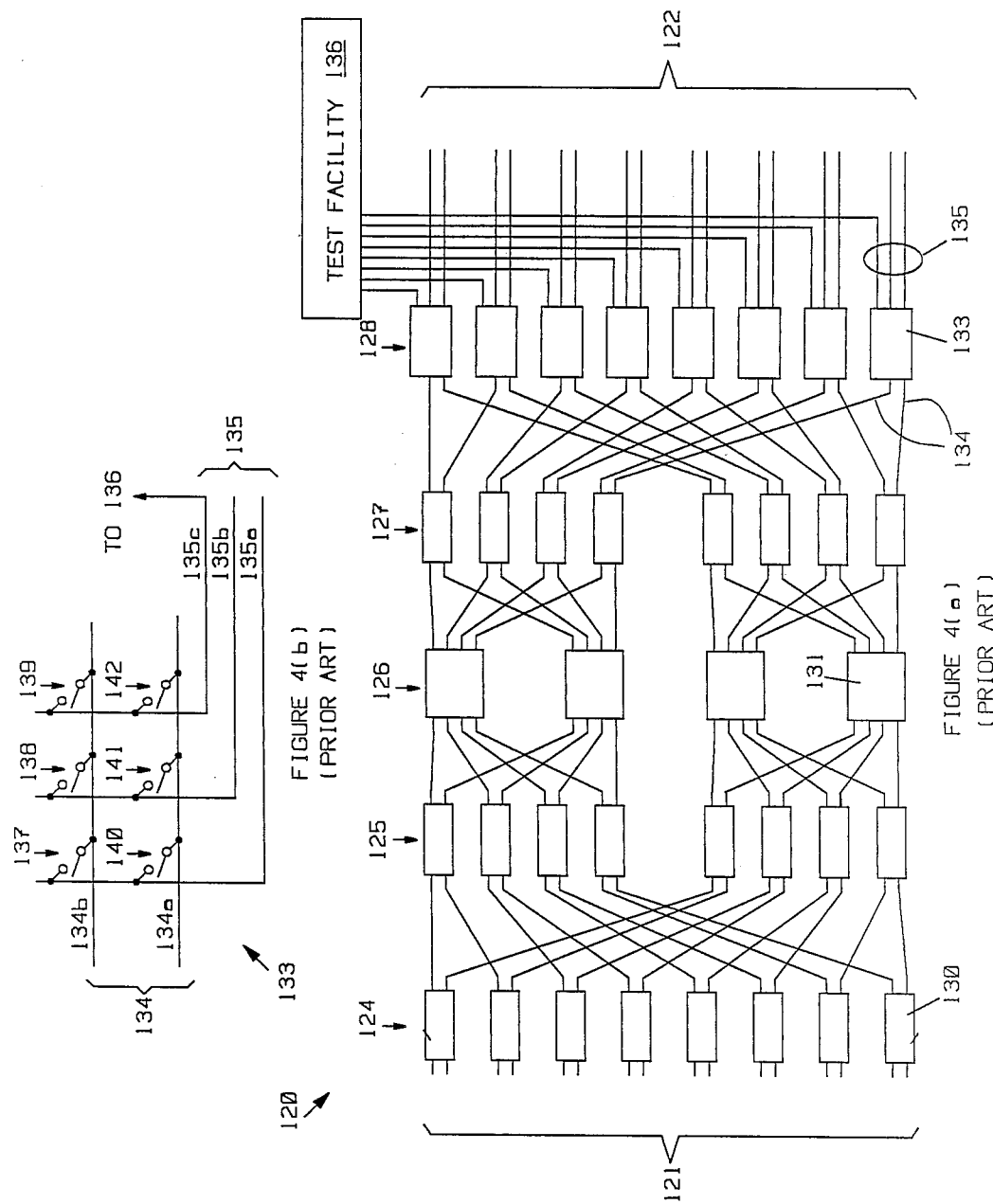
FIG. 4(a) is a block diagram of a prior art cross-connect switch connected to a test facility.
FIG. 4(b) is a schematic diagram of the output stage switch modules shown in FIG. 4(a).

One prior art method for providing this test access may be most easily understood with reference to cross-connect switch 120 shown in FIG. 4(a). Cross-connect switch 120 is a five stage cross-connect switch for connecting an input line 121 to an output line 122. Stages 124, 125, and 127 are constructed from 2×2 switch modules of which switch module 130 is typical. The center stage 126 is constructed from 4×4 switch modules of which switch module 131 is typical. The output stage 128 is constructed from switch modules 133 which have 2 input lines 134 and three output lines 135. One output from each switch module 133 is connected to a test facility 136.

A more detailed schematic of a switch module 133 is shown in FIG. 4(b). Each switch module 133 consists of six switch points 137-142. Each switch point connects one of the output lines 135 to one of the input lines 134. For example, by closing switch point 140, input line 134a is connected to output line 135a. By closing switch point 142 connecting output line 135c to input line 134a, test facility 136 can be connected to input line 134a. If input line 134a were part of a call path connecting one of the cross-connect switch inputs 121 to a subscriber loop connected to one of the output lines 135a or 135b through cross-connect switch 120, test facility 136 would have access to the subscriber loop in question as well as the circuitry connected to the input line 121 in question. In effect, the addition of switch points 139 and 142 allow test facility 136 to gain access to any call path which passes through the switch modules 133 in question.

This method for providing test access has at least three problems. First, it significantly increases the cost of the cross-connect switch. The test facility must be capable of connection to each of the output lines connected to an output stage switch module. Hence, if there are N output lines on the output switch modules, N additional switch points must be included in each switch module. For example, in the cross-connect switch shown in FIG. 4(a) each output switch module in the absence of the test facility would be a 2×2 switch module having 4 switch points therein. To include one test access input for each such switch module, the number of switch points in each output switch module must be increased from 4 to 6. This increases the cost of the output switch modules by at least 50%. In addition, a third type of switch module, a 2×3 switch module, must be manufactured to produce the cross-connect switch. This increases both the manufacturing costs and the cost of maintaining spare parts.

The second problem with this type of prior art test access system is that it significantly increases the cost and complexity of the test facility itself. To gain access to each of the output lines, the test facility must contain a multiplexer which allows it to be connected to a selected one of the test output lines. Hence, the test facility must include one switch point per output switch module.

Third, this type of test access does not provide any means for isolating malfunctions in the cross-connect switch itself. If one of the switch points in one of the switch modules in the cross-connect switch fails, a malfunction will be detected because a connection between an input line to the cross-connect switch and an output line of the cross-connect switch will not be possible if the connection path includes the faulty switch module. However, prior art testing facilities do not include any means for ascertaining which switch module on the connection path includes the faulty switch point. At best, one can ascertain that one of the N switch modules used to construct the particular path contains a faulty switch point. Here, N is equal to the number of stages. Ideally, one would like to be able to ascertain which switch module was at fault so that a craftsperson could be dispatched to replace the faulty switch module without further testing.

A cross-connect switch according to the present invention avoids these problems. A cross-connect switch according to the present invention differs from a prior art cross-connect switch without test access in that a number of input lines and/or output line are used for test access. The number of lines needed for test access is significantly less than one per input or output switch module. Hence, the present invention represents a significant improvement over the prior art test access systems.

Figure 5:
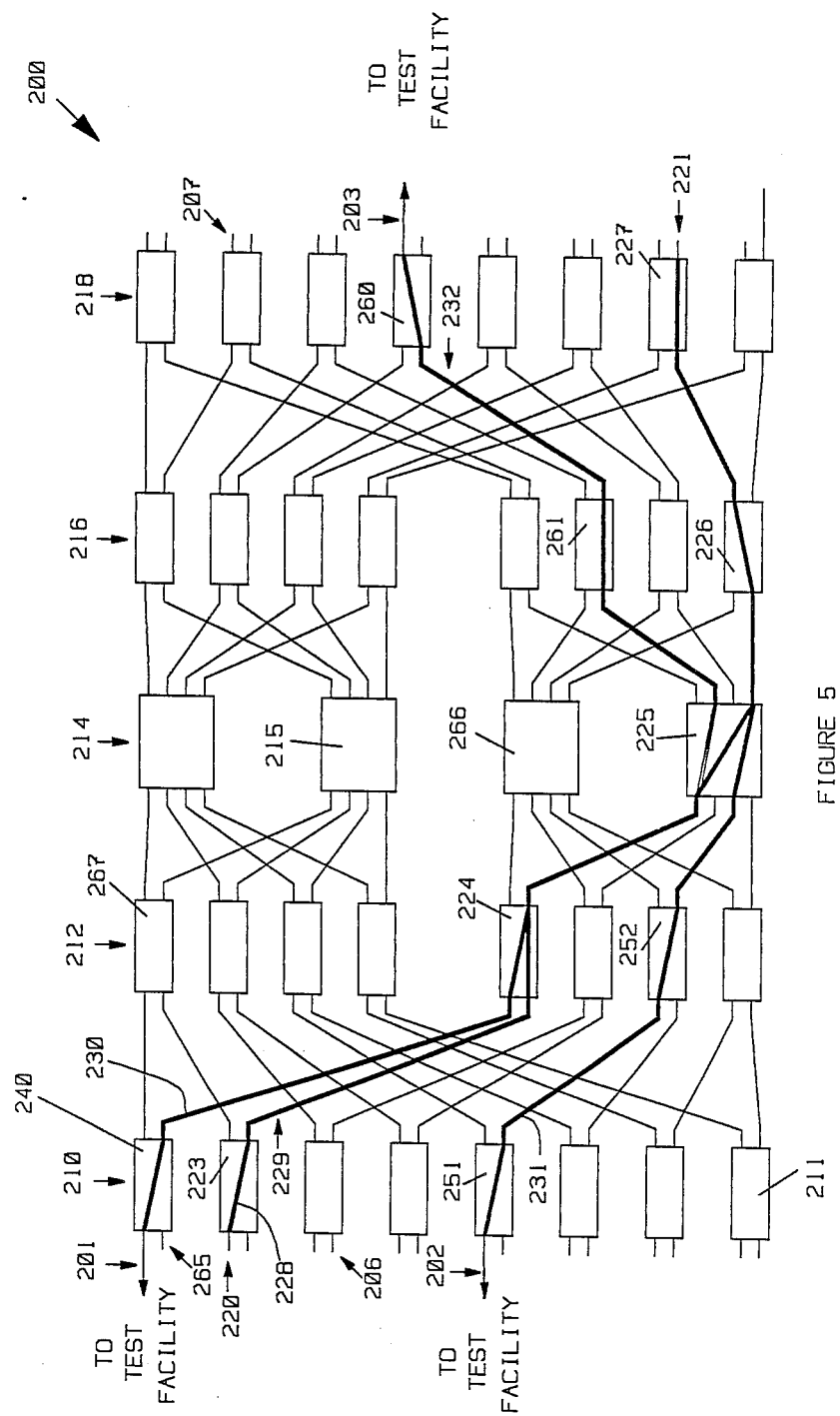
FIG. 5 is a block diagram of one embodiment of a cross-connect switch according to the present invention.

The present invention may be more easily understood with reference to the exemplary cross-connect switch 200 shown in FIG. 5. Cross-connect switch 200 is a 14×15 cross-connect switch having three test ports, 201, 202, and 203, respectively. A typical input line is shown at 206, and a typical output line is shown at 207. Structurally, cross-connect switch 200 is similar to a five stage 16×16 Clos switch in which two of the input lines and one of the output lines have been reserved for test purposes and, hence, are not used for their normal connection functions. Cross-connect switch 200 has an input stage 210 and an output stage 218, each such stage being constructed from 8 2×2 switch modules of which switch module 211 is typical. Similarly, cross-connect switch 200 has second and fourth stages, 212 and 216, respectively, which are also constructed from 2×2 switch modules. The center stage 214 of cross-connect switch 200 is constructed from four 4×4 switch modules of which switch module 215 is typical. These switch module sizes are chosen because they minimize the number of switch points in the cross-connect switch.

It is assumed that various ones of said input lines are connected to various ones of said output lines at any given time. A typical such connection is shown between input line 220 and output line 221 via path 229 which will be referred to as a call path. This connection is made by closing the relevant switch points in modules 223, 224, 225, 226, and 227. A connection between an input line and an output line in a switch module is indicated by a line connecting the input and output lines in question. Connection 228 is an example of such a connection.

Output line 221 can be connected to the test facility by connecting any of the test ports to the existing call path between input line 220 and output line 221. This may be accomplished by using some of the currently free input and output lines on the various switch modules to connect the switch module containing the test port to one of the switch modules through which call path 229 passes. At any given time, only a fraction of the switch modules have all of their input lines connected to output lines therein. When one or more of these lines is free, it may be used to create a path which originates at the test port and ends on a switch module through which call path 229 passes.

It should be noted that any input line to a switch module may be simultaneously connected to any subset of the output lines of that switch module. Similarly, any output line of a switch module may be simultaneously connected to any subset of the input lines to that switch module. Thus, once a path is established from the test port to a switch module through which the call path passes, the test port may be connected to the call path by closing the appropriate additional switch point in the module, thus providing a "T" connection.

Three possible such connections are shown by paths 230, 231, and 232 respectively. Path 230 connects test port 201 to call path 229 through modules 240 and 224. Path 231 connects test port 202 to call path 229 through switch modules 251, 252, and 225. Finally, path 232 connects test port 203 to call path 229 through modules 260, 261, and 225.

At any given time, one or more of these test paths may be unavailable. For example, if both of the input lines to switch module 224 were in use, test path 230 would be unavailable. This would be the case if switch module 224 were also being used to create a second call path which begins on input line 265 and passes through switch modules 224 and 266. In this case, test port 201 could only be used to access those switch modules which were also accessible from switch module 267 in stage 212.

Hence, the present invention depends on being able to find test paths connecting one of the test ports to one of the switch modules through which the call path passes and which also has free input and output ports. In the preferred embodiment of the present invention, two types of test paths, referred to as direct and zig-zag test paths, are used.

The test paths shown in FIG. 5 are referred to as direct test paths, since each such test path starts at a test port and proceeds in the same direction through the cross-connect switch until it reaches the switch module at which the "T" connection is to be made. It will be apparent from an examination of FIG. 5 that the ability to connect a given switch module to a given test port by a direct path increases as the number of switch stages between the test port and switch module in question increases. For example, test port 201 can only access switch modules 267 and 224 in stage 212. However, test port 201 can access all of the switch modules in the center and following stages provided the relevant input and output lines are free in the switch modules in the intermediate stages 212.

Figure 6:
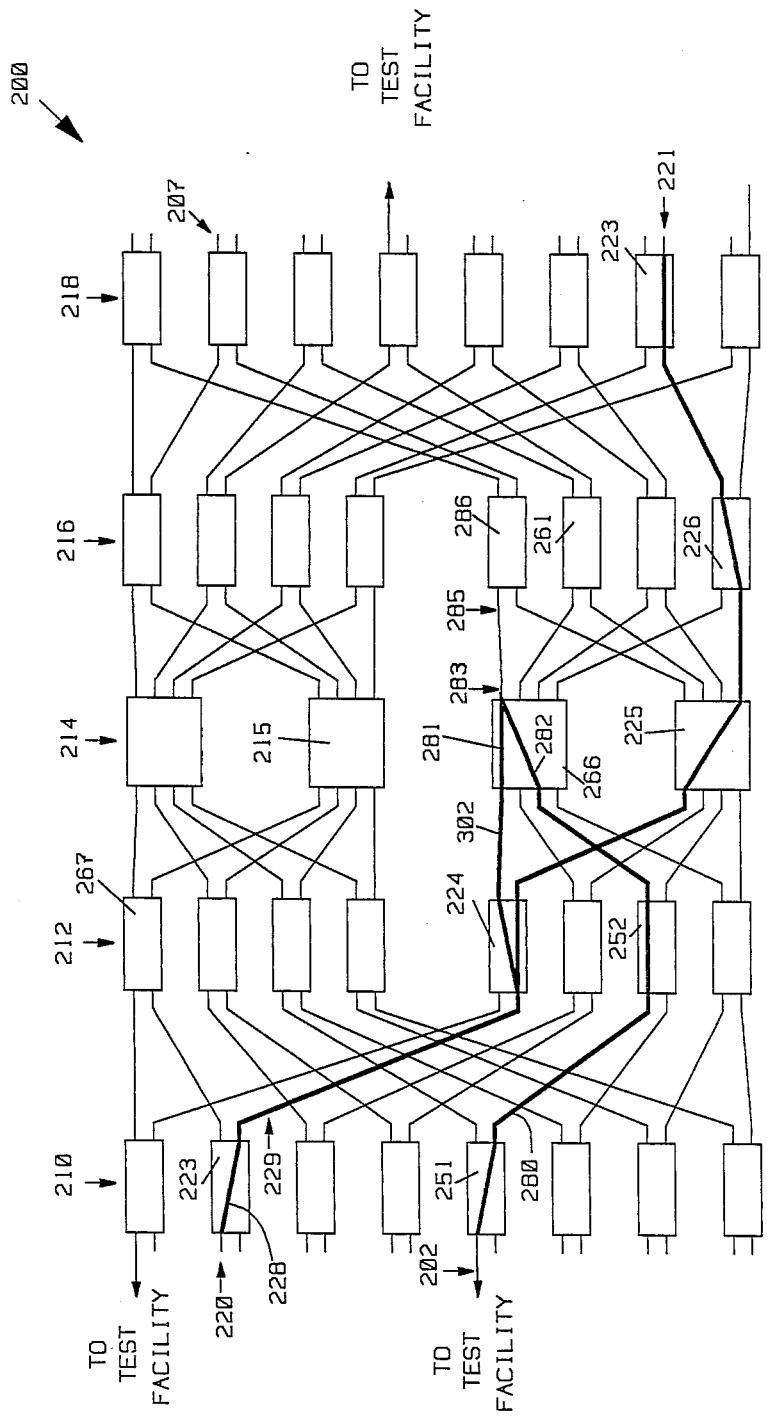
FIG. 6 illustrates a zig-zag path for connecting a test port in a cross-connect switch according to the present invention to a call path.

To provide greater access to the switch modules in the stages near to the test ports, "zig-zag" paths are also employed. FIG. 6 illustrates cross-connect switch 200 shown in FIG. 5 with a zig-zag test path 280 for connecting test port 202 to call path 229 at switch module 224. Test path 280 passes through switch modules 251 and 252 in the forward direction and then reverses direction in switch module 266. This reversal is accomplished by connecting input lines 281 and 282 of switch module 266 to output line 283. For this approach to be successfully used, input line 285 of switch module 286 in stage 216 must not be connected to any of the output lines of switch module 266 while the test path is operative. The switch module in which the direction reversal occurs will be referred to as the pivot switch module hereinafter.

It will be apparent from FIG. 6 that zig-zag paths provide increased access between test ports and switch modules which are in the adjacent stage to the stage containing the test ports. As a result, the probability of being able to find a test path between one of the test ports and any given call path is significantly improved if zig-zag paths are included in the allowable test paths.

Figure 7:
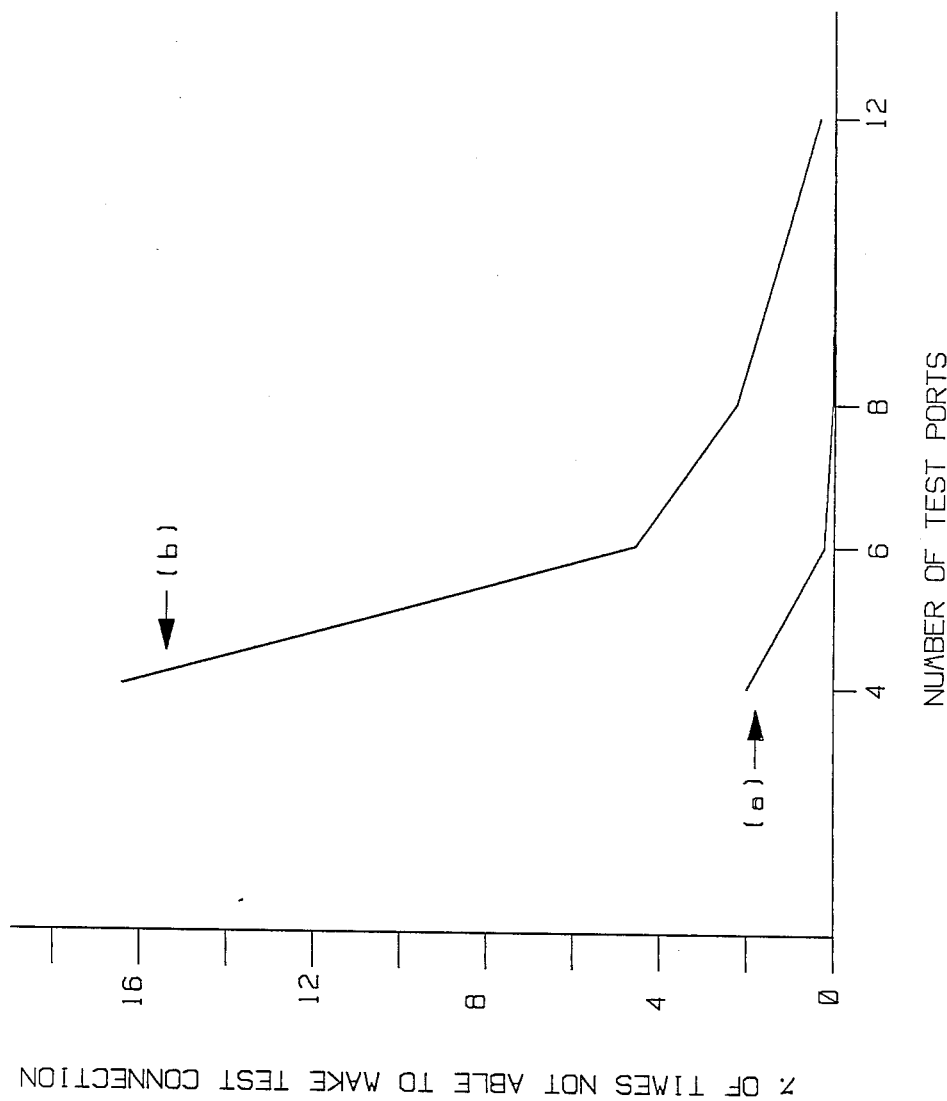
FIG. 7 illustrates the improvements obtained by including zig-zag test paths in a cross-connect switch according to the present invention.

This is illustrated in FIG. 7 which compares the probability of failing to make a connection to a given call path with and without zig-zag paths. Curve (a) is the probability with direct paths and paths having one zig-zag. Curve (b) is the probability with direct paths only. The data plotted in FIG. 7 were computed for a cross-connect switch having 648 input lines and 1296 output lines. And, 85% of the input lines were busy. Cross-connect switches having different numbers of input and output lines will be discussed in more detail below. For the purposes of this discussion, it is sufficient to note the large improvement obtained by allowing test paths with one zig-zag. In fact, with 12 test ports, the use of zig-zag paths having only one reversal of direction reduces the probability of not being able to make a test connection by more than a factor of 50.

Figure 8:
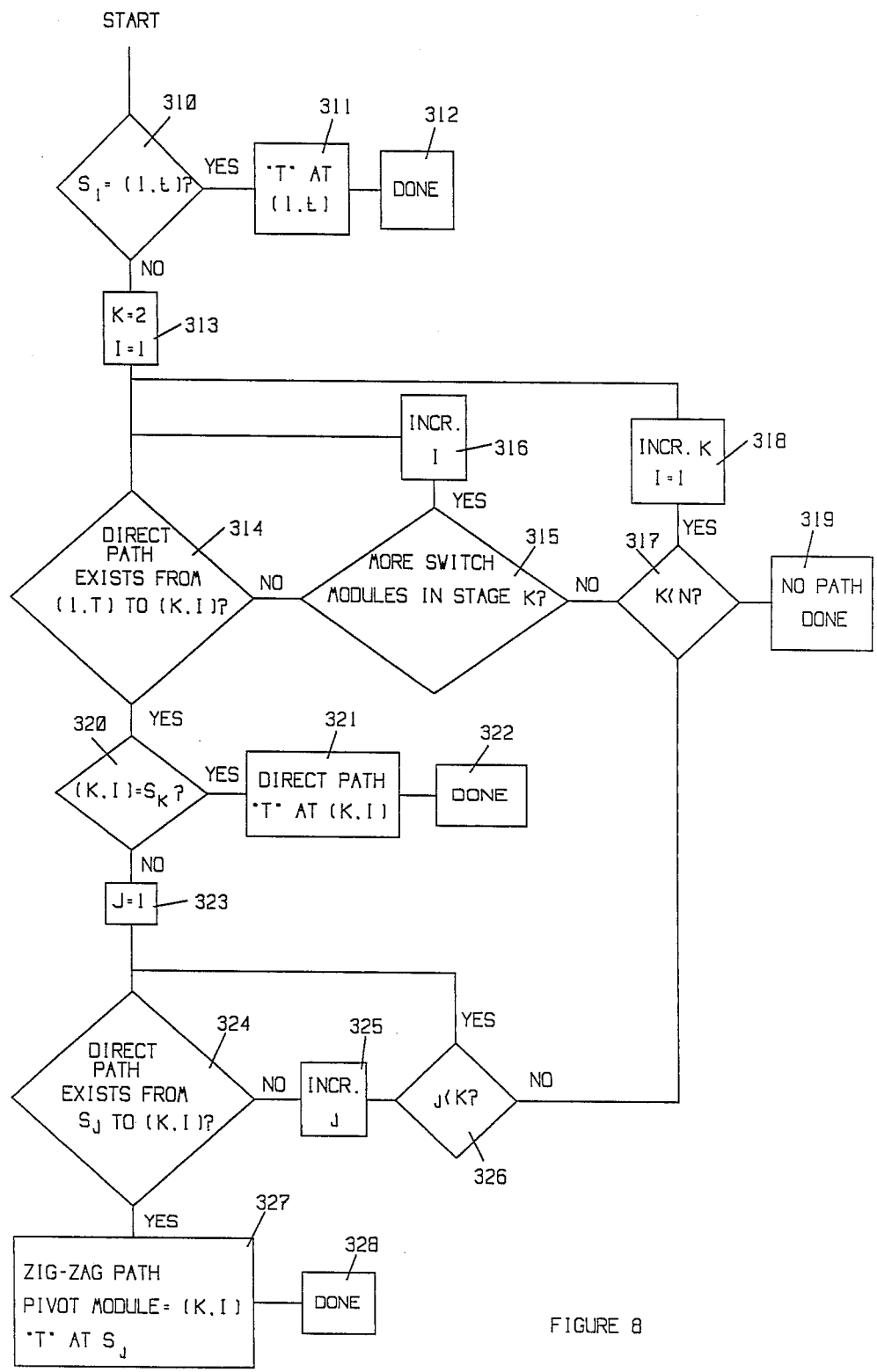
FIG. 8 is a flow chart of a computer algorithm for finding test paths which connect a given test port to a given call path.
Figure 9:
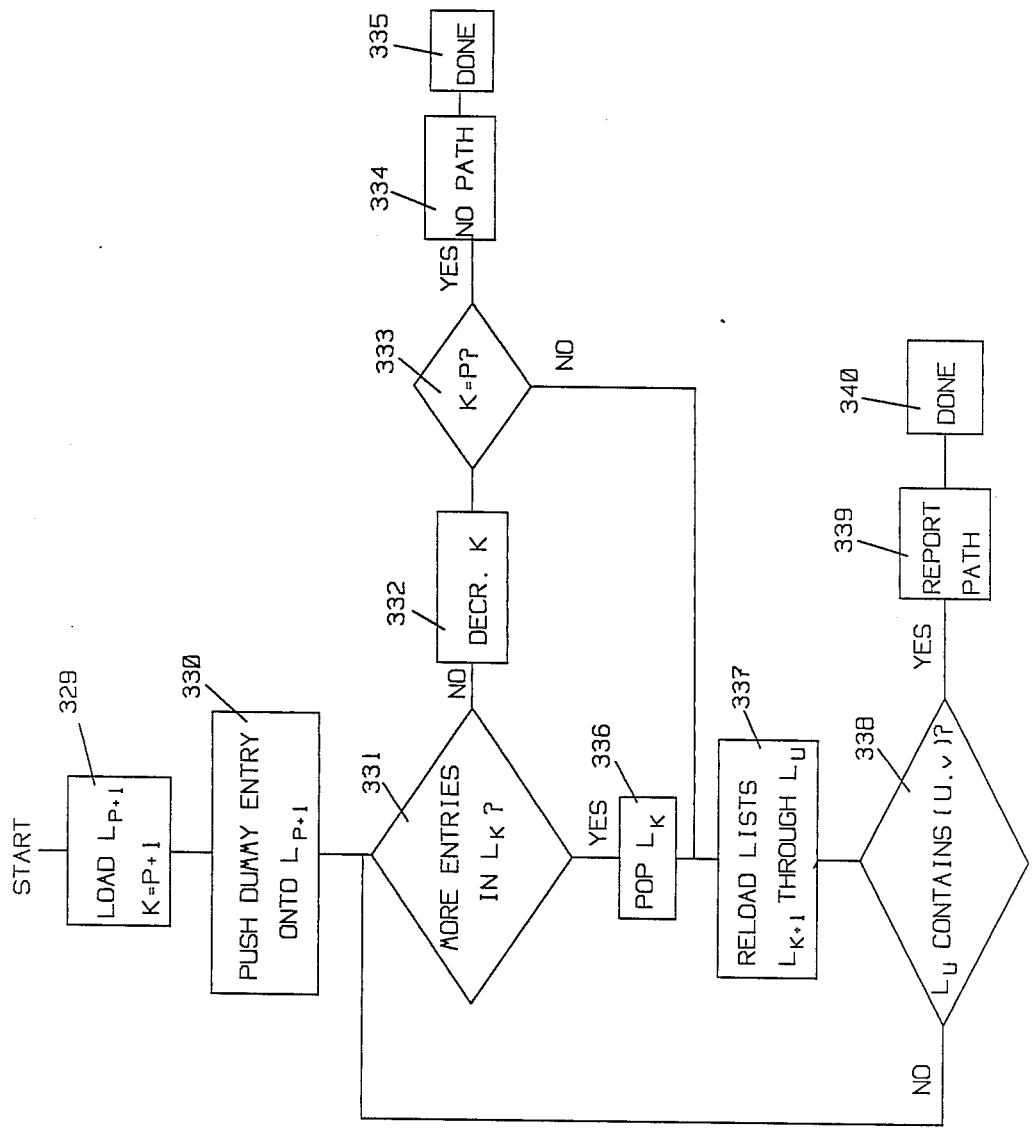
FIG. 9 is a flow chart of a computer algorithm for finding a path connecting a specified pair of switch modules.

The preferred method of finding test paths which connect a given test port to a call path can be more easily understood with reference to FIGS. 8-9 which are flow charts for a computer algorithm which computes the available test paths. As noted above, each of the switch modules in the cross-connect switch is connected to a computer which controls the switch points within the switch module. The connections to this computer have been omitted from the figures for reasons of clarity. This computer stores the configuration of the cross-connect switch including a map of which switch modules are connected and which switch points are closed at any given time.

For the purposes of this discussion, it is useful to assign the various switch modules identification numbers. A given switch module may be specified by giving the stage of the cross-connect switch in which it is located and the position of the switch module in that stage. The notation (x,y) denotes the switch module "y" in stage "x". The stages of the cross-connect switch are numbered from one to N beginning with the stage which contains the test port in question. Hence, referring to FIG. 5, if test paths connecting test port 201 are to be found, the first stage of the cross-connect switch would be stage 210 and the last stage of the cross-connect switch would be stage 218. Within each stage, the switch modules are numbered from top to bottom of the stage as shown in FIG. 5. Hence, switch module 240 shown in FIG. 5 is the first switch module of the first stage, and switch module 211 is the 8th switch module of the first stage. If test paths connecting test port 221 were sought, the numbering of the stages would be reversed. That is, stage 218 would now be the first stage and stage 210 would be the last stage.

It should be noted that a path connecting switch module (x,y) to switch module (p,q) may be unambiguously specified by the list of switch modules through which the path passes. The individual input and output lines used need not be given, since there is only one line connecting any two given switch modules in adjacent stages.

Any zig-zag path having one pivot switch module can be decomposed into two direct paths. The first direct path connects the test port to the pivot switch module, and the second direct path connects the pivot switch module to a switch module on the call path which is to be bridged. Referring again to FIG. 6, zig-zag path 280 is composed of a direct path passing through switch modules 251, 252, and 266, and a direct path connecting switch module 266 to switch module 224. Here, switch module 266 is the pivot switch module.

FIG. 8 is a flow chart of the basic test path finding algorithm. The algorithm takes as its input the configuration of the cross-connect switch, the identity of the test port, and the call path which is to be bridged. The switch modules through which the call path passes will be denoted by $S_k$, where k runs from one to N, the number of stages in the cross-connect switch. That is, if the call path passes through switch module x in stage y, $S_y=(y,x)$. By definition, the test port is located in the first stage. The test port will, therefore, be in switch module (1,t) where t is the number of the first stage switch module which contains the test port in question.

The computer starts by examining $S_1$ to be sure that it is not (1,t) as shown at 310–312 in FIG. 8. If it is, then the test path is merely a "T" connection in switch module (1,t). For most of the possible call paths and test ports, this will not be the case. In these cases, the computer must sequentially examine each of the stages after the first stage to determine if a test path can be constructed utilizing the switch modules prior to this stage and one switch module from this stage. At any given time, the stage being examined is indicated by an index K and the switch module in that stage which is being examined is indicated by an index I. These indices are initialized as shown in 313. If the computer is examining the Ith module in the Kth stage, the algorithm first checks for a direct path from (1,t) to switch module I as shown at 314. If no such path exists, the algorithm proceeds to the examination of the next switch module unless this switch module was the last one. This is shown at 315–319 in FIG. 8. If there are no more switch modules to examine, a test path between (1,t) and the call path does not exist. In this case, the algorithm is repeated with a different test port.

If such a path exists, the algorithm checks for the case in which (K,I) is also $S_K$ as shown at 320–322. In this case, a direct test path exists from (1,t) to the call path with the "T" connection being made at $S_K$.

If $S_K$ is not equal to (K,I) but a test path exists to (K,I), the algorithm checks for a zig-zag path in which (K,I) is the pivot module and in which the "T" connection is made at $S_j$ for some j between 1 and K. This is shown at 323–328 in FIG. 8. The search is accomplished by sequentially examining each $S_j$ to determine if a direct path exists between (K,I) and $S_j$. If such a pair exists, then a zig-zag path also exists, and this zig-zag path is reported.

If no such path exists, the algorithm proceeds to the next switch module to be examined as shown at 326. A path may be absent because the switch modules in question may not be directly connected by a direct path. Alternatively, a path may, in principle, exist but one or more switch points needed to construct the path are being used to construct other call paths through the cross-connect switch. The next switch module will be either be the next switch module in stage K or the first switch module of the next stage. If all of the switch modules are exhausted without finding a test path, then another test port is chosen and the process repeated.

The above algorithm depends on being able to find a path connecting a first switch module (P,q) to a second switch module (U,v). In principle, this can be accomplished by sequentially checking each possible combination of switch modules which joins the two switch modules in question. However, it will be apparent to those skilled in the art that such a search is impractical in a large cross-connect switch since the number of possible combinations can easily be in the hundreds of millions.

Hence, in the preferred embodiment of the present invention, this is accomplished by first reducing the number of possible combinations using the observation that any given switch module only connects to a small fraction of the switch modules in the adjacent stages. For each stage, a push down list, $L_i$, is created which contains the identities of the switch modules which can be reached from a given switch module in the prior stage. A flow chart of an algorithm which utilizes such lists to find a path from (P,q) to (U,v) is shown in FIG. 9.

The algorithm starts as shown at 329 and 330 by loading $L_{P+1}$ with switch modules which can be reached from (P,q). Each such switch module is pushed onto list $L_{P+1}$ after checking to be sure that a connection is possible and that the required switch points are free. An index K which is used to keep track of the the lists is initialized to point to list $L_{P+1}$. A dummy entry is loaded onto the top of $L_{P+1}$ to save repeating computer code.

Next, $L_K$ is examined to determine if there are any remaining entries as shown at 331. If an entry exists, the top entry on $L_K$ is popped to expose the new entry as shown at 336 and lists $L_{K+1}$ through $L_U$ are reloaded as shown at 337. If no such entry exists, K is decremented and and the lists reloaded as shown at 332 and 333. If K is equal to P after the decrementing operation, the process is terminated as shown at 334 and 335 because no path is possible.

Assuming that the lists were reloaded as shown at 337, list $L_i$ will contain the switch modules which can be connected to the switch module on the top of $L_{i-1}$ for $i=P+1$ to U. The algorithm then examines each entry in the last list, $L_U$, to determine if an entry exits which is equal to (U,v) as shown at 338. If such an entry exists, a path can be constructed between the switch modules in question. The switch modules making up this path are those on the top of each of the push-down lists $L_i$ for $i=P+1$ to $U-1$. This path is reported as shown at 339 and 340.

If none of the entries in $L_U$ is (U,v), the current entry on the top of $L_{U-1}$ is "popped off" to expose a new switch module. List $L_U$ is then loaded with the switch modules which can be reached from this new switch module and the process repeated. When the Kth list, $L_K$, is exhausted, i.e., the last entry in that list has been examined and popped off, the top entry on $L_{K-1}$ is popped off, and lists $L_K$ to $L_U$ are reloaded. If $L_{P+1}$ is exhausted without finding a path, no such path exists.

The preferred location of the test ports and the preferred number of test ports will depend on the size and shape of the cross-connect switch. In general, the number of test ports will be significantly less than the number of switch modules in either the input or output stages of the cross-connect switch. Hence, the cost of providing test access utilizing a cross-connect switch according to the present invention is significantly less than that encountered with prior art cross-connect switches.

If the cross-connect switch has equal numbers of input and output lines, the test ports are preferred in both the input and output stage switch modules. Assuming that a call path has an equal probability of going through any given switch module in a given stage of the cross-connect switch, the test ports are preferably equally spaced in the input and output stages.

If the cross-connect switch has fewer input than output lines, the test ports are preferably located on the switch modules in the output stage. If there are more input lines than output lines, the test ports are preferably located on the switch modules in the input stage.

Cross-connect switches having different numbers of input and output lines are particularly useful in telecommunication applications in which a subset of a large number of communication lines is to be connected to a central office via feeder lines. For example, when a telephone cable serving a particular geographic area is put in place, redundant communication lines are normally provided to provide alternate connections between subscribers' premises and the central office serving those premises. When these redundant lines are not in use, they are not connected to the central office. A cross-connect switch may be used to automate the substitution of one of these redundant lines for an existing line when the existing line fails. In such a system, a cross-connect switch having typically twice as many input lines as output lines is used. The lines from the subscribers' premises and the redundant lines are connected to the output side of the cross-connect switch. The feeder lines from the central office are connected to the input side of the cross-connect switch. By closing the appropriate switch points in the cross-connect switch, the desired lines to the subscribers' premises may be connected to the central office. Such a cross-connect switch is discussed in detail in a copending U.S. Patent Application (Ser. No. 098,519).

Figure 10:
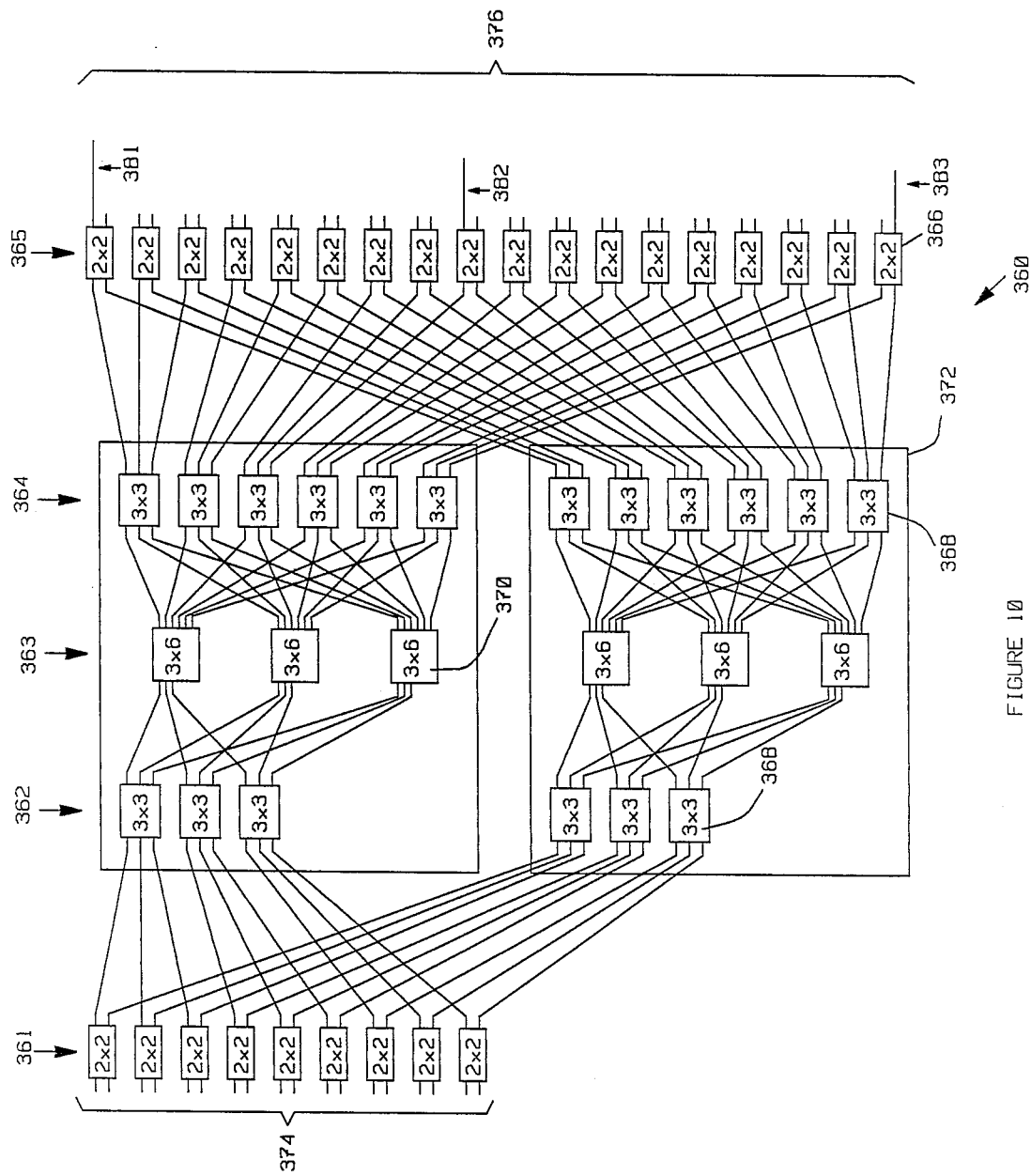
FIG. 10 is a block diagram of a cross-connect switch according to the present invention in which the number of input lines is different from the number of output lines.

FIG. 10 illustrates a cross-connect switch 360 having 18 input lines 374 and 36 output lines 376. The center stage of cross-connect switch 360 is constructed from switch modules 370 having three input lines and 6 output lines. Cross-connect switch 360 has five stages, 361 through 365. Stages 361 and 365 are constructed from switch modules 366 having 2 input lines and 2 output lines, and stages 362 and 364 are constructed from switch modules 368 having 3 input lines and 3 output lines.

The center stage switch modules are grouped together. Three center stage switch modules are connected such that each switch module is connected to 6 switch modules in stage 364 and 3 switch modules in stage 362. These center stage switch modules and the switch modules in stages 362 and 364 to which they are connected can be viewed as a single three stage switch module 372 having 9 input lines and 18 output lines. Cross-connect switch 360 may then be viewed as a three stage switch having a center stage constructed from two switch modules having 9 input lines and 18 output lines.

Since the output stage 365 has more lines than the input stage 361, the test ports are preferably located in the output stage switch modules. Three such test ports are shown at 381 through 383. This choice of test port location increases the probability of finding a test path that will connect to any given call path with the connection being made in a switch module in stages 363, 364, or 365.

At any given time, cross-connect switch 360 will have a number of call paths established therethrough. Each of these call paths is constructed by closing switch points in the various switch modules through which the call path passes. These switch points are not available for constructing the desired test paths. As more and more call paths are established through the cross-connect switch, the ability to find free switch points for constructing a test path decreases.

Consider the case in which 18 call paths are simultaneously setup through cross-connect switch 360. In this case, 18 input and output lines will be in use in each stage of cross-connect switch 360. As a result, every input and output line in the switch modules in stages 361 and 362 will be in use. Hence, it would not be possible to construct a test path which passes through these stages. However, only half of the input and output lines in the switch modules in stages 364 and 365 would be busy. Hence, it is possible to construct test paths which bridge a call path on the switch module in stages 364 and 365 through which the call path passes.

The above example is an extreme case, since a cross-connect switch almost never operates at 100% of capacity. However, it is clear from this example that the probability of being able to make a connection to a call path on a switch module on the output side of center stage 363 is greater than that of making a connection to a switch module through which the call path passes on the input side of center stage 363.

Utilizing test ports on the output side of the cross-connect switch makes use of this increased probability in two ways. First, the probability of finding a test path is increased. Since there are more switch points available in the output half of the cross-connect switch, there are more possible test paths.

Second, the computational time needed to find a test path may be significantly reduced. It has been found that the process of searching for a test path can be simplified without a significant decrease in the probability of finding a test path. In particular, it has been found experimentally that the search for a test path can be terminated when all switch modules in the center stage have been examined. If no test path has been found by this point in the above described algorithm, another test port is chosen.

The above description of the present invention has been made with reference to a cross-connect switch having an odd number of stages and constructed according to the three stage topology described by Clos. It will be apparent to those skilled in the art that the present invention is applicable to a much larger class of cross-connect switches.

Figure 11:
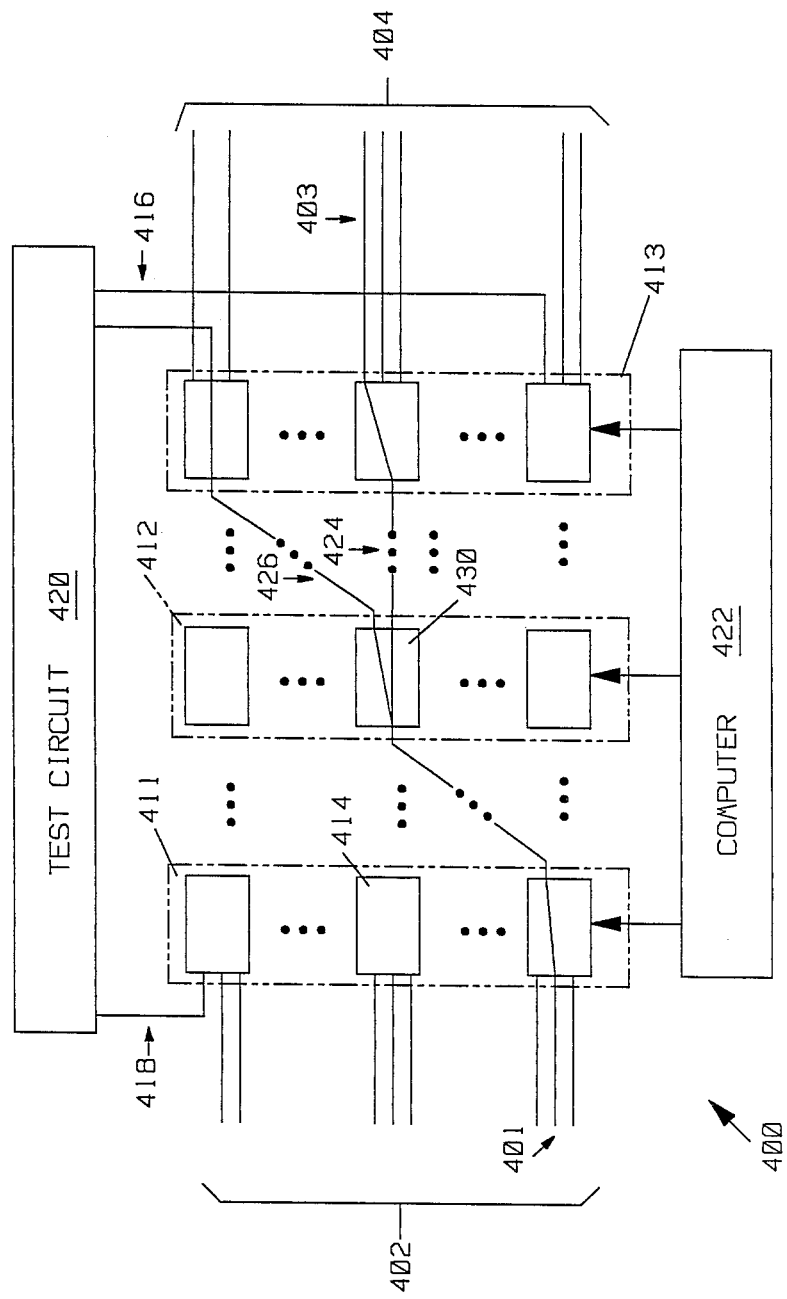
FIG. 11 is a block diagram of another embodiment of the present invention.

A more general embodiment of the present invention is illustrated in FIG. 11 at 400. Cross-connect switch 400 has a plurality of cross-connect switch input lines 402 and a plurality of cross-connect switch output lines 404. Cross-connect switch 400 provides a means for coupling a specified one of the input lines 402 to a specified one of output lines 404 without interrupting existing connections between other input and output lines. A typical such connection is shown between input line 401 and output line 403.

Cross-connect switch 400 is constructed from a plurality of switch modules of which 414 is typical. Each switch module has a plurality of input and output lines, referred to as switch module input and output lines, respectively. Any switch module input line can be coupled to any switch module output line by closing one of a plurality of switch points in the switch module. There is one such switch point corresponding to each possible combination of a switch module input line and a switch module output line.

These switch modules are organized into an input stage 411, an output stage 413, and one or more intermediate stages 412. Each cross-connect switch input line 402 is connected to a corresponding input line in a switch module in the input stage 411. Similarly, each cross-connect switch output line 404 is connected to a corresponding output line of a switch module in output stage 416.

Each intermediate stage 412 includes a plurality of intermediate switch modules. Each said intermediate stage switch module is coupled to at least one switch module in the preceding stage by connecting an input line thereof to an output line of a switch module in said preceding stage. Similarly, each intermediate stage switch module is coupled to at least one switch module in the stage following said intermediate stage by connecting an output line thereof to an input line of a switch module in the following stage.

A connection is made between a cross-connect switch input line such as line 401 and a cross-connect switch output line such as line 403 by closing the appropriate switch points to form a call path such as path 424. These switch points are under the control of a computer 422.

Cross-connect switch 400 includes a test circuit 420 which is preferably under the control of computer 422. Test circuit 420 is used to make electrical measurements on any call path connected to it. Test circuit 420 is connected to the various call paths through one or more test ports. Each test port comprises one of the cross-connect switch input or output lines. Test 418 is an example of a cross-connect switch input line being used for a test port. Test port 416 is an example of a cross-connect switch output line being used for a test port.

Connections are made between a call path and a test port by making a bridging connection in a switch module through which the call path passes as illustrated in switch module 430. The test port is connected to this switch module by closing a number of switch points which are not currently needed for implementing other call paths to form a connection between the test port and the switch module in which the bridging connection is to be made.

The possible paths from a given test port to each of the switch modules on the call path are computed by computer 422 using an algorithm such as the one described above with reference to FIGS. 8 and 9. If such a path exists, computer 422 closes the switch points in question to form the path.

The above description of the present invention has been made with reference to making a single bridging connection to a call path which has been established between a given input line and a given output line in the cross-connect switch. This test path is typically used to connect the output line and equipment attached to said output line to a test apparatus for the purpose of testing said line and/or equipment. However, the present invention may also be used to isolate malfunctions within the cross-connect switch itself.

Consider the case in which a malfunction is detected on a particular call path which has been established through the cross-connect switch. The call path connects the central office to a subscriber loop servicing a telephone subscriber. The malfunction in question could be the result of a malfunction in the lines connecting the subscriber to the output side of the cross-connect switch. Alternatively, the malfunction could be in the cross-connect switch itself. In particular, one of the switch points on the call path could be faulty. If this is the case, a craftsperson must ascertain which switch module contains the faulty switch point and replace that switch point. The present invention can be used to determine the identity of the switch module in question.

Since the call path having the malfunction is known, the search for the faulty switch module can be limited to those switch modules on that call path. In general, there are a number of points along this call path at which a test path may be connected. Assuming that test paths which connect to the call path at each switch module on said call path can be found, the faulty switch module can be isolated by comparing test results obtained using different test paths. If the presence of other call paths in the cross-connect switch prevents all switch modules from being so connected to a test path, it is still possible to reduce the number of possible switch modules which must be examined to find the faulty switch module. Hence, the present invention is also of value in diagnosing and identifying problems in the cross-connect switch itself.

Accordingly, there has been described herein an improved cross-connect switch which provides test access both to the switch modules contained therein and the lines connected thereto. Various modifications to the present invention will become apparent to those skilled in the art from the foregoing description and accompanying drawings. Accordingly, the present invention is to be limited solely by the scope of the following claims.

What is claimed is:

1. A cross-connect switch having a plurality of cross-connect switch input lines and a plurality of cross-connect switch output lines, said cross-connect switch providing means for coupling specified ones of said input lines to specified ones of said output lines, said cross-connect switch comprising an input stage, an output stage, and one or more intermediate stages arranged in a linearly ordered array of stages between said input stage and said output stage, said input stage being the first stage in said ordered array and said output stage being the last stage in said ordered array, each of said input stage, output stage, and intermediate stage comprising a plurality of switch modules, each said switch module comprising a plurality of input lines, a plurality of output lines, and a plurality of switch points;

each said intermediate stage switch module being coupled to a switch module in the immediately preceding stage by connecting an input line of said intermediate stage switch module to an output line of a switch module in said preceding stage, and each said intermediate stage switch module being coupled to a switch module in the stage immediately following the said intermediate stage containing said switch module by connecting an output line of said switch module to an input line of a said switch module in said following stage, wherein, each said input, output, and intermediate stage switch modules includes one said switch point corresponding to each possible combination of a said input line of said switch module and a said output line of said switch module, each said switch point having a first state in which said switch point makes a connection between said input line and said output line and a second state in which said switch point does not make a connection between said input line and said output line, said cross-connect switch further comprising:

test means comprising one or more test ports, each said test port comprising either one of said output stage switch module output lines or one of said input stage switch module input lines, the number of said test ports being less than the number of said switch modules in said output stage and the number of switch modules in said input stage;

means for determining if a connection can be made between a specified one of said test ports and a first specified switch module in said cross-connect switch; and means coupled to said switch points for causing said connection to be made if said determining means determines that said connection exists.

2. The cross-connect switch of claim 1 wherein the total number of output stage switch module output lines is larger than the total number of input stage switch module input lines and wherein each said test port comprises an output stage switch module output line.

3. The cross-connect switch of claim 1 wherein said determining means further comprises means for determining if a connection can be made between a second specified switch module in said cross-connect switch and said first specified switch module.

4. In a cross-connect switch having a plurality of cross-connect switch input lines and a plurality of cross-connect switch output lines, said cross-connect switch providing means for coupling a specified one of said input lines to a specified one of said output lines without interrupting existing connections between other input and output lines, said cross-connect switch comprising an input stage, an output stage, and one or more intermediate stages arranged in a linearly ordered array of stages between said input stage and said output stage, said input stage being the first stage in said ordered array and said output stage being the last stage in said ordered array, each of said input, output, and intermediate stages comprising a plurality of switch modules, each said switch module comprising a plurality of input lines, a plurality of output lines, and a plurality of switch points, each said intermediate stage switch module being coupled to a switch module in the immediately preceding stage by connecting an input line of said switch module to an output line of a switch module in said preceding stage, and each said intermediate stage switch module being coupled to a switch module in the stage immediately following the said intermediate stage containing said switch module by connecting an output line of said switch module to an input line of a said switch module in said following stage, wherein, each said input, output, and intermediate stage switch modules includes one said switch point corresponding to each possible combination of a said input line of said switch module and an output line of said switch module, each said switch point having a first state in which said switch point makes a connection between said input line and said output line and a second state in which said switch point does not make a connection between said input line and said output line, said cross-connect switch further comprising means for setting the state of each said switch point, a method for connecting a test system to a specified call path comprising an electrical connection between a specified input line on a specified input switch module and a specified output line on a specified output switch module, said call path passing through one switch module in each said stage of said cross-connect switch, said call path comprising a connection between an input line of each said switch module through which said call path passes and an output line thereof, said method comprising the steps of connecting a test line to said test system, said test line being chosen from a plurality lines comprising either predetermined input stage switch module input lines or predetermined output stage switch module output lines, the number of said test lines being less than the number of said switch modules in said output stage and the number of said switch modules in said input stage;

examining a specified stage of said cross-connect switch to determine if a first switch module therein may be connected to said test line without interrupting any existing connection between an input stage switch module input line and an output stage switch module output line; and if said stage includes such a switch module, determining if said call path includes a connection between an input line and an output line of said first switch module, and if said call path includes such a connection, altering the states of the said switch points in said cross-connect switch to make a connection between said test line and said input or output line.

5. The method of claim 4 wherein if said specified stage includes said first switch module but said first switch module is not included in said call path, said determining step further comprises determining if said first switch module may be connected to a second switch module through which said call path does pass without interrupting an existing connection between any input stage switch module input line and an output stage switch module output line, and if said first switch module can be so connected to a said second switch module, altering the states of the said switch points in said cross-connect switch to make a first connection between said test line and said first switch module and a second connection between said first switch module and said second switch module to connect said input or output line of said second switch module through which said call path passes to said test line.

6. In a cross-connect switch having a plurality of cross-connect switch input lines and a plurality of cross-connect switch output lines, said cross-connect switch providing means for coupling a specified one of said input lines to a specified one of said output lines without interrupting existing connections between other input and output lines, said cross-connect switch comprising an input stage, an output stage, and one or more intermediate stages arranged in a linearly ordered array of stages between said input stage and said output stage, said input stage being the first stage in said ordered array and said output stage being the last stage in said ordered array, each of said input, output, and intermediate stages comprising a plurality of switch modules, each said switch module comprising a plurality of input lines, a plurality of output lines, and a plurality of switch points, each said intermediate stage switch module being coupled to a switch module in the immediately preceding stage by connecting an input line of said switch module to an output line of a switch module in said preceding stage, and each said intermediate stage switch module being coupled to a switch module in the stage immediately following the said intermediate stage containing said switch module by connecting an output line of said switch module to an input line of a said switch module in said following stage, wherein, each said input, output, and intermediate stage switch module includes one said switch point corresponding to each possible combination of a said input line of said switch module and an output line of said switch module, each said switch point having a first state in which said switch point makes a connection between said input line and said output line and a second state in which said switch point does not make a connection between said input line and said output line, said cross-connect switch further comprising means for setting the state of each said switch point, a method for connecting a test system to a specified call path comprising an electrical connection between a specified input line on a specified input switch module and a specified output line on a specified output switch module, said call path passing through one switch module in each said stage of said cross-connect switch, said call path comprising a connection between an input line of each said switch module through which said call path passes and an output line thereof, said method comprising the steps of connecting a test line comprising a predetermined input stage switch module input line or a predetermined output stage switch module output line to said test system;

examining a specified stage of said cross-connect switch to determine if a first switch module therein may be connected to said test line without interrupting any existing condition between an input stage switch module input line and an output stage switch module output line; and if said stage includes such a switch module, determining if said call path includes a connection between an input line and an output line of said first switch module, and if said call path includes such a connection, altering the states of the said switch points in said cross-connect switch to make a connection between said test line and said input or output line, wherein if said specified stage includes said first switch module but said first switch module is not included in said call path, said determining step further comprises determining if said first switch module may be connected to a second switch module through which said call path does pass without interrupting an existing connection between any input stage switch module input line and an output stage switch module output line, and if said first switch module can be so connected to a said second switch module, altering the states of the said switch points in said cross-connect switch to make a first connection between said test line and said first switch module and a second connection between said first switch module and said second switch module to connect said input or output line of said second switch module through which said call path passes to said test line, wherein said specified stage is initially chosen to be the stage of said cross-connect switch which contains said test line and wherein said specified stage is chosen to be another stage of said cross-connect switch which has not been so examined each time said determining step fails to find a connection between said test line and said call path.

* * * * *

UNITED STATES PATENT AND TRADEMARK OFFICE
CERTIFICATE OF CORRECTION

PATENT NO. : 4,845,736
DATED : July 4, 1989
INVENTOR(S) : Edward C. Posner, et al.

It is certified that error appears in the above-identified patent and that said Letters Patent is hereby corrected as shown below:

Column 5, line 57, after "T" insert --or--.

Column 7, line 29, after "4(a)" insert --,--.

Column 11, line 15, delete "in" and insert --at--.

Column 11, line 35, delete "pair" and insert --path--.

Signed and Sealed this

Second Day of October, 1990

*Attest:*

HARRY F. MANBECK, JR.

*Attesting Officer*  *Commissioner of Patents and Trademarks*